(12) United States Patent
Newell et al.

(10) Patent No.: US 11,769,106 B2
(45) Date of Patent: Sep. 26, 2023

(54) MOBILE TRANSPORT PLATFORM

(71) Applicant: DISH Network L.L.C., Englewood, CO (US)

(72) Inventors: Nicholas Brandon Newell, Centennial, CO (US); Prakash Subramanian, Littleton, CO (US); John C. Calef, III, Colorado Springs, CO (US); Allyson Lotz, Wildwood, MO (US); Zachary Pierucci, Chicago, IL (US)

(73) Assignee: DISH Network L.L.C., Englewood, CO (US)

( * ) Notice: Subject to any disclaimer, the term of this patent is extended or adjusted under 35 U.S.C. 154(b) by 241 days.

(21) Appl. No.: 16/230,715

(22) Filed: Dec. 21, 2018

(65) Prior Publication Data

US 2020/0202293 A1 Jun. 25, 2020

(51) Int. Cl.
| G06Q 10/0833 | (2023.01) |
| G06Q 10/0832 | (2023.01) |
| B64C 39/02 | (2023.01) |
| B64U 101/60 | (2023.01) |

(52) U.S. Cl.
CPC ....... *G06Q 10/0833* (2013.01); *B64C 39/024* (2013.01); *G06Q 10/0832* (2013.01); *B64U 2101/60* (2023.01); *B64U 2201/104* (2023.01)

(58) Field of Classification Search
CPC ............. G06Q 10/083; G06Q 10/0833; G06Q 10/0835; G06Q 10/0837
See application file for complete search history.

(56) References Cited

U.S. PATENT DOCUMENTS

| 9,469,476 | B1 | 10/2016 | Ashoori et al. |
| 9,892,379 | B1 | 2/2018 | Danyluk et al. |
| 10,029,787 | B1* | 7/2018 | Lesser ................... B64C 39/02 |
| 10,699,239 | B2* | 6/2020 | Waris .............. G06Q 10/08355 |
| 2009/0144109 | A1* | 6/2009 | Knight .................. G06Q 10/08 705/334 |
| 2014/0032034 | A1* | 1/2014 | Raptopoulos ........ G05D 1/0088 701/25 |
| 2015/0145643 | A1 | 5/2015 | Fadell et al. |
| 2015/0183528 | A1 | 7/2015 | Walsh et al. |
| 2016/0033966 | A1 | 2/2016 | Farris et al. |
| 2016/0068264 | A1 | 3/2016 | Ganesh et al. |
| 2016/0111006 | A1* | 4/2016 | Srivastava .......... G08G 5/0026 701/3 |
| 2016/0117934 | A1 | 4/2016 | Soundararajan |
| 2016/0171435 | A1 | 6/2016 | Newton et al. |

(Continued)

FOREIGN PATENT DOCUMENTS

| KR | 20180095401 A | 8/2018 |
| WO | 2001041605 A2 | 6/2001 |
| WO | 2017176824 A1 | 10/2017 |

OTHER PUBLICATIONS

UPS, Delivery Confirmation, 2017, UPS (Year: 2017).*

(Continued)

*Primary Examiner* — Emmett K. Walsh
(74) *Attorney, Agent, or Firm* — Perkins Coie LLP

(57) ABSTRACT

A request is determined to move from a first location to a second location to receive an item, the request specifying a (Continued)

transport vehicle to move the mobile platform from the first location to the second location. The mobile platform is actuated to attach to the transport vehicle.

19 Claims, 5 Drawing Sheets

(56) References Cited

U.S. PATENT DOCUMENTS

| | | | | |
|---|---|---|---|---|
| 2016/0272308 | A1* | 9/2016 | Gentry | B64C 39/024 |
| 2017/0090484 | A1* | 3/2017 | Obaidi | B64D 47/08 |
| 2017/0160735 | A1* | 6/2017 | Mikan | G08G 5/0034 |
| 2017/0267343 | A1* | 9/2017 | Chen | G08G 5/0026 |
| 2017/0351994 | A1* | 12/2017 | Waris | G06Q 10/08 |
| 2018/0053136 | A1* | 2/2018 | DaCosta | H04W 4/20 |
| 2018/0070753 | A1 | 3/2018 | Eveloff et al. | |
| 2018/0312069 | A1* | 11/2018 | McClymond | B64C 25/52 |
| 2018/0365636 | A1* | 12/2018 | Lucrecio | G06Q 50/30 |
| 2019/0031075 | A1* | 1/2019 | Koch | B60P 1/6481 |
| 2019/0100314 | A1* | 4/2019 | Prager | B64D 1/22 |
| 2019/0212735 | A1* | 7/2019 | Fujiwara | G05D 1/0212 |
| 2019/0220044 | A1* | 7/2019 | Ruth | G06Q 10/00 |
| 2020/0017210 | A1* | 1/2020 | Neubecker | E05F 15/70 |

OTHER PUBLICATIONS

Daknama, Rami, and Elisabeth Kraus. "Vehicle routing with drones." arXiv preprint arXiv:1705.06431 (2017). (Year: 2017).*

Parrot Drones SAS. Parrot BEBOP 2 DRONE User Guide. 2018 [online], [retrieved Dec. 21, 2018]. <URL: https://www.parrot.com/files/s3fs-public/firmware/bebop-2_user-guide_uk_2_0.pdf>.

Drone Guru. Best Drones With Return Home Feature 2018. Jan. 29, 2018 [online], [retrieved Dec. 21, 2018]. <URL http://www.fitdrones.com/best-drones-return-home-feature/>.

Technokontrol-Global Ltd. TK-Smart Delivery Box (SDB). 2018 [online], [retrieved Dec. 21, 2018]. <URL : https://www.technokontrol.com/en/products/smart-delivery-box.php>.

Drone Delivery Systems. Airbox. 2018 [online], [retrieved Dec. 21, 2018]. <URL: https://airboxtechnologies.com/>.

Ingar, LLC. Drone Delivery Hub. 2018 [online], [retrieved Dec. 21, 2018]. <URL: http://www.dronedeliveryhub.com/>.

* cited by examiner

MOBILE TRANSPORT PLATFORM

BACKGROUND

Various schemes have been envisioned for delivering items via autonomous and/or unmanned vehicles such as aerial drones. However, regardless of whether an item is delivered via an unmanned vehicle or by a human, it is desirable that the item be appropriately received, e.g., that receipt of the item be detected and confirmed, and that a user be able to retrieve the item.

DRAWINGS

DETAILED DESCRIPTION

Exemplary System

Figure 1:
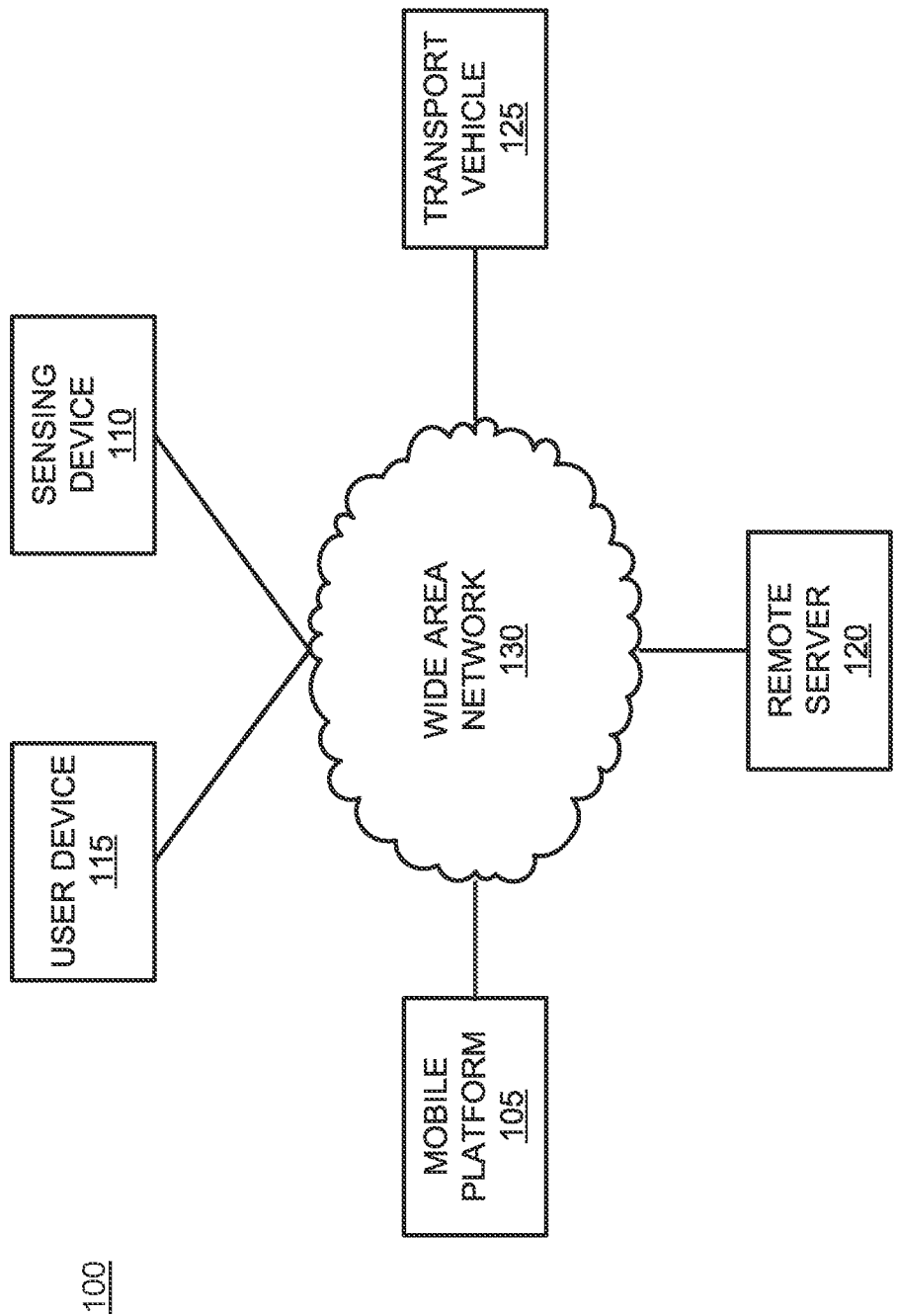
FIG. 1 is a block diagram of a system for monitoring and controlling a mobile platform.

FIG. 1 is a block diagram of a system 100 for monitoring and controlling a mobile platform 105. The system 100, in addition to the platform 105, can further include one or more sensing devices 110, user devices 115, remote servers 120, and transport vehicles 125. These various devices can communicate via a network 130. The mobile platform 105 can be provided to receive and/or transport one or more items, e.g., a package for delivery. The mobile platform 105 can be moved from a first location to a second location by one or more transport vehicles 125. For example, the mobile platform 105 could be at a first location when an item is to be delivered at a second location. Movement of the mobile platform 105 could be initiated according to data from one or more sensing devices 110, input from a user device 115, and/or an instruction from a remote server 120. One or more transport vehicles 125 could be selected to move the mobile platform 105 from a first to a second location according to a variety of criteria, such as a proximity of the vehicle 125 to the mobile platform 105, available connection mechanisms between the platform 105 and vehicle 125, a current planned route of the vehicle 125, etc.

Figure 2:
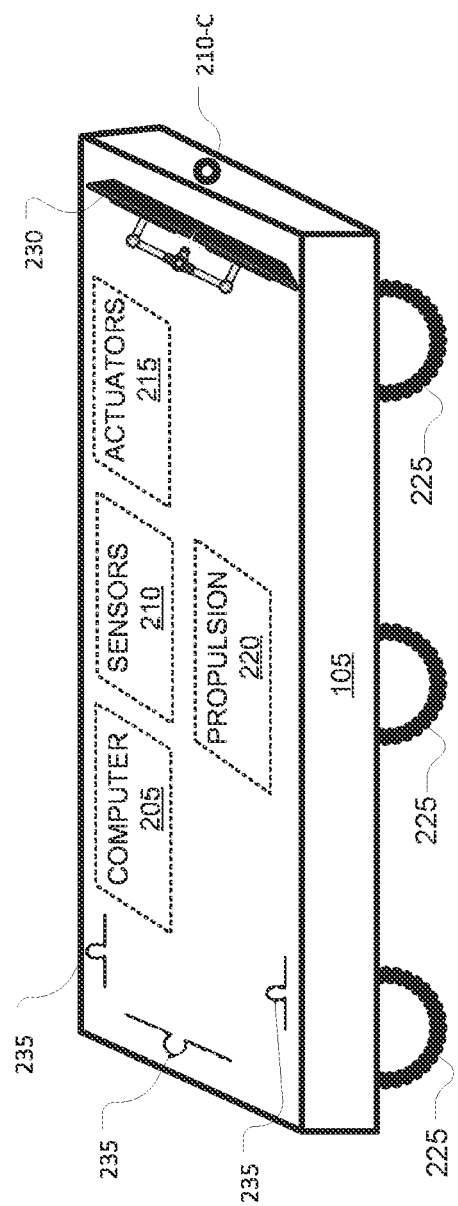
FIG. 2 illustrates an example mobile platform that could be included in the system of FIG. 1.

A mobile platform 105 can be configured in a variety of ways to provide for ground and/or above-ground (i.e., flight) movement. For example, as illustrated in FIG. 2, a mobile platform 105 can be configured for autonomous movement. The mobile platform 105 can include a computer 205 arranged on a communications bus or the like to receive data from sensors 210, and to provide commands or instructions to actuators 215. For example, the mobile platform 105 computer 205 can, based on data from sensors 210, command actuators 215 to initiate steering and/or a propulsion 220 to move wheels 225 of the platform 105. For example, propulsion 220 can include an electric motor or the like along with a power source, such as a rechargeable battery. An actuator 215 could include a digital processor programmed to receive commands from a computer 205, and to activate or move electrical and/or mechanical components to activate and/or move platform 105 components such as a propulsion, steering, etc. Platform 105 sensors can include a variety of sensors, such as a camera 210-C mounted to an exterior surface of the platform 105, a weight sensor (not shown) to detect a force applied to a horizontal surface of the platform 105, e.g., by placing an item such as a package on the surface or in a basket or container that may be provided thereon to receive and retain items, a global positioning system (GPS) sensor to provide geo-coordinates (e.g., a latitude, longitude pair) specifying a location of the platform 105, etc.

A mobile platform 105 typically further includes means for retaining items and/or for connecting to another vehicle such as a transport vehicle 125. Such means for connecting can include magnets 230, hooks 235, as well as other mechanisms not illustrated in FIG. 2, such as a receptacle mateable with a conventional trailer hitch or the like, suction cups, or other suitable mechanisms. The magnets 230 can be provided on extensible arms or the like, possibly movable by one or more motors, to extend to contact a vehicle 125 surface. The hooks 235 can be provided at various locations on one or more surfaces of the platform 105, and a complementary hook, e.g., at an end of a movable arm or hitch of a vehicle 125, could be secured to the hook 235 to tow the platform 105 behind a vehicle 125. Alternatively or additionally, magnets 230, suction cups, etc., could be used to secure the platform 105 to a vehicle 125, e.g., an unmanned aerial vehicle (UAV) an automobile, etc. Yet further, as mentioned above, a container or cage (not shown) could be provided to receive and retain items.

A sensing device 110 can be any device connected to the network 130 that includes one or more sensors providing data directly or indirectly via the network 130. For example, devices 110 can include dedicated sensing devices, e.g., cameras or the like that may be part of security or monitoring systems, or sensors included in various network devices, such as doorbells, streetlights, road signs, etc. Sensing devices 110 may be devices included in what is sometimes referred to as an Internet of Things (IOT). IOT devices 110 are often configured for a low-power, low-bandwidth communications, e.g., with a gateway or hub connected to a conventional wide area or local area network, such as may be included in the network 130. Accordingly, IOT devices can provide the advantage of being able to provide data continuously or substantially continuously, or at prescribed times, without consuming power and/or network bandwidth that might otherwise make operation of the device 110 practically prohibitive. A sensing device 110 that so communicates with the network 130 may be said to communicate indirectly with the network 130, whereas a sensing device 110 that communicates via conventional local or wide area network mechanisms, such as Wi-Fi, ethernet, cellular, etc., may be said to communicate directly with the network 130.

Sensors included in sensing devices 110 can include any device that reports data about physical phenomena, i.e., about objects in a physical environment. In the context of this disclosure, an object is a physical, i.e., material, item that can be detected by sensing physical phenomena (e.g., light or other electromagnetic waves, or sound, etc.), e.g., phenomena detectable by sensors. Accordingly, a sensing device 110 can include various sensors including two-dimensional cameras, three-dimensional imaging devices such as lidar (LIght Detection and Ranging), radar, ultrasound, etc.

The user device 115 may be a computing device such as a mobile telephone (e.g., a smart phone running the Android or iOS operating systems), a tablet or laptop, smart wearable (smart watch, fitness band, etc.), other computing device, etc. The user device 115 includes one or more processors and one or more memories. The user device 115 may be able to communicate via the wide area network 130, e.g., via a cellular connection or the like, and/or via a local network, e.g., including Wi-Fi® or the like.

A remote server 120 can also communicate with a mobile platform 105, sensing device 110, user device 115, and/or transport vehicle 125 via the network 130. The server 120 represents one or more computing devices, i.e., including a processor and a memory storing instructions executable by the processor. The server 120 can send, receive, and, in an included and/or associated data store, store data concerning one or more mobile platforms 105, sensing devices 110, user devices 115, and/or transport vehicles 125. For example, the server 120 could store sets of data in tables or the like. Data that could be stored by the server 120 is discussed further below.

A transport vehicle 125 may be any vehicle, e.g., land, water, and/or air, that can provide transport to a mobile platform 105. A transport vehicle 125 may operate autonomously, i.e., partly or entirely without human intervention.

The network 130 represents one or more mechanisms, typically including the Internet, for delivering content 110 from a content source 105 to a media device 125. The network 130 can encompass any distance or area on the surface of the earth over which a connection to the network 130 can be achieved, and may include the Internet or some other wide area network (WAN), as well as a local area network (LAN) that is limited to a specified geographic area, typically a single building, complex, or campus. The network 130 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized), e.g., including wireless and/or wired mechanisms, such as Wifi®, Ethernet, etc. It is to be understood that computing devices disclosed herein to be communicating via the network 130 and/or other mechanisms such as Bluetooth® or the like, commonly include or be communicatively coupled to via the communication interface 140, e.g., a wireless and/or wired communication transceiver. The computer 110 is generally arranged for communications on a communication network 130, for example.

System Data

Concerning a mobile platform 105, the server 120 could store a table or the like including respective records for each of a plurality of mobile platforms 105. Each record could include a unique or substantially unique identifier for the respective mobile platform 105, along with a current (or last reported) location of the platform 105. Other possible data fields or columns that could be stored for a platform 105 include a home or default location, a movement mode (e.g., ground, air, water), a weight, mass, and/or dimensions of the platform 105, types of attachment mechanisms provided (e.g., magnets, hooks, etc.), a capacity, e.g., a weight, mass, and/or dimensions of an item that can be borne by the platform 105, etc., as well as an identifier for a user device 115 associated with the mobile platform 105, i.e., that is authorized to instruct movement of the platform 105.

Yet further, the server 120 could store a cost or fee for using the mobile platform 105. For example, as explained further below, a mobile platform 105 associated with a user identifier could be used to receive delivery of an item, where the delivery is associated with the user identifier. However, it is also possible that a mobile platform 105 not associated with a user identifier could be used to receive delivery of an item, where the delivery is associated with the user identifier. In this example, the server 120 could store a cost or fee such as a fee per kilometer, per minute, etc., for using the mobile platform 105 to receive delivery of an item. Further, the server 120 could store different fees for a mobile platform 105 according to times of day of use, days of week of use, a geographic area in which the mobile platform 105 is being used, etc. Yet further alternatively or additionally, the mobile platform 105 could store its fee or fees which could then be provided to the server 120 upon request.

Concerning a sensing device 110, the server 120 could store a table or the like including respective records for each of a plurality of sensing devices 110. Each record could include a unique or substantially unique identifier for the respective sensing device 110, along with a current (or last reported) location of the sensing device 110. Other possible data fields or columns that could be stored for a sensing device 110 include a flag or binary data value indicating that the sensing device 110 is or is not movable or mobile, a type of data provided from the sensing device 110 (e.g., digital image data, ultrasound data, radar data, etc.), etc. Further, the server 120 could store, for each sensing device 110, a log, e.g., a set of records, of reported data. For example, a sensing device 110 could provide data to a server 120 periodically, upon some triggering event (e.g., detection of movement by a motion detector), etc., and the server 120 could store the received data along with a timestamp received from the device 110 specifying a time when a datum or data was received.

Concerning a user device 115, the server 120 could store a table or the like including respective records for each of a plurality of user devices 115. Each record could include a unique or substantially unique identifier for the respective user device 115, possibly also with a current (or last reported) location of the user device 115. Other possible data fields or columns that could be stored for a user device 115 could include an identifier for a mobile platform 105 associated with the user device 115, i.e., for which the user device 115 can instruct movement.

Concerning a transport vehicle 125, the server 120 could store a table or the like including respective records for each of a plurality of transport vehicles 125. Each record could include a unique or substantially unique identifier for the respective mobile platform 105, along with a current (or last reported) location of the platform 105. Other possible data fields or columns that could be stored for a transport vehicle 125 could include a home or default location, a current planned route, e.g., a set of route segments and/or a destination form the current location, a permissible area of navigation for the vehicle 125, e.g., a radius in kilometers around the specified home or default location, a type and/or subtype of vehicle, e.g., ground passenger car, ground cargo vehicle, air UAV, air manned vehicle, etc., parameters of platform 105 that can be accommodated.

Yet further, as with mobile platforms 105, costs or fees associated with a transport vehicle 125 could be stored in the server 120 and/or a memory of a transport vehicle 125. For example, the transport vehicle 125 could charge a fee per distance, e.g., kilometer, to transport a mobile platform 105. Further, as with mobile platforms 105, these four transport vehicles 125 could vary according to time of day, day of week, geographic area, etc.

Processes

Figure 3:
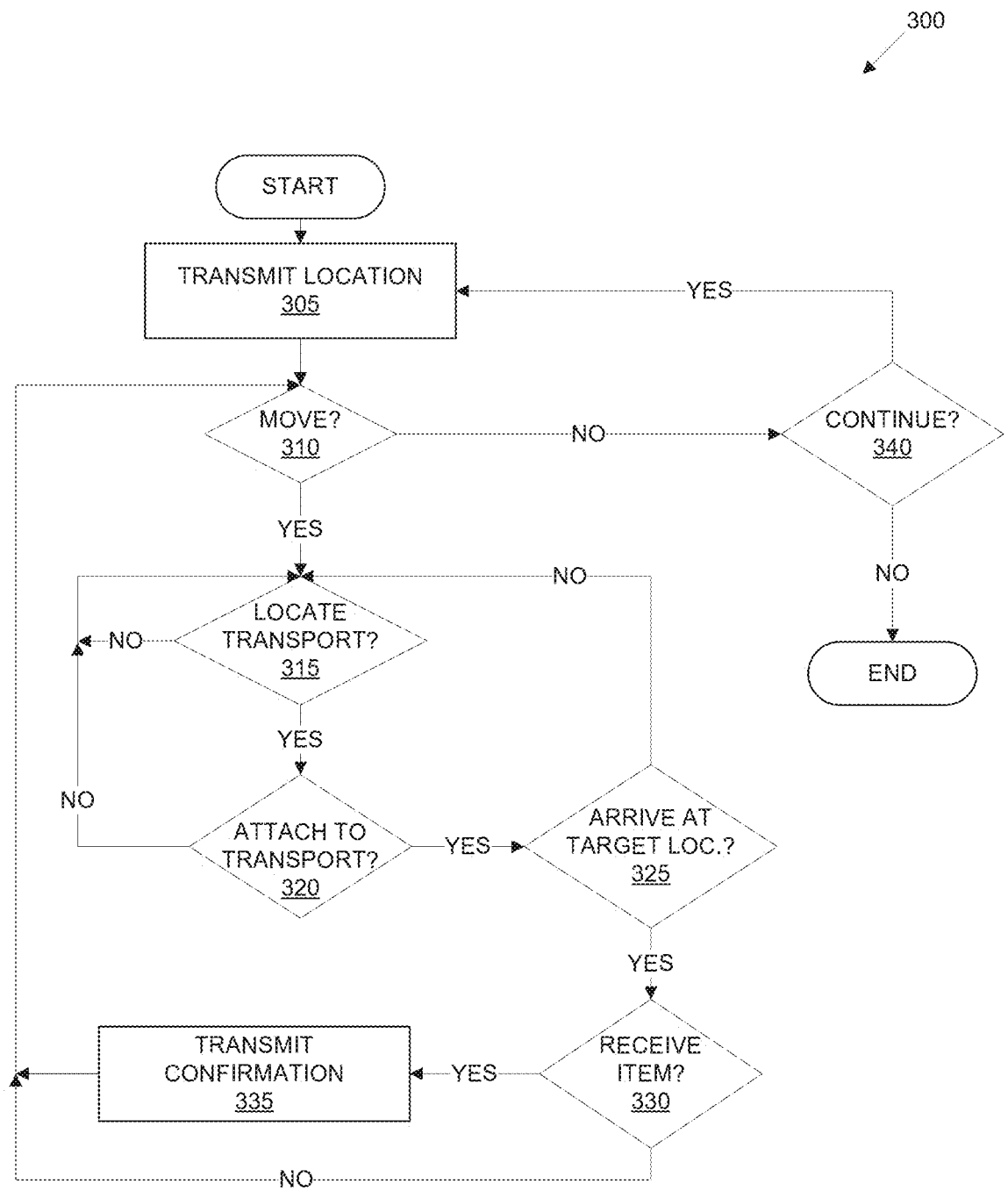
FIG. 3 illustrates an exemplary process for deploying a mobile platform.

FIG. 3 illustrates an exemplary process 300 for operation of a mobile platform 105, including steps typically carried out by the platform 105 computer 205.

The process 300 begins in a block 305, in which the mobile platform 105 provides its location to the server 120. As noted above, a GPS sensor 210 can provide geo-coordinates of the platform 105 to the platform computer 205. Further, although the block 305 is illustrated as occurring once in the process 300, it should be understood that the computer 205 can be programmed to provide substantially continuously, or at least periodically, the geo-coordinates to the server 120, e.g., every minute, every 10 minutes, every hour, etc., and/or, to avoid unnecessary consumption of power and/or bandwidth, the computer 205 can be programmed to provide the geo-coordinates of the mobile platform 105 upon a change of location by more than a specified distance, e.g., 100 meters, and/or the computer 205 can be programmed to provide the geo-coordinates upon a request from the server 120 and/or a user device 115. Thus, the server 120 stores a current or last reported location of a mobile platform 105 along with an identifier for the mobile platform 105. In some implementations, the block 305 can be omitted, e.g., where, as described below, the platform computer 205 generates, rather than receives from the server computer 120, a move request or directive.

Next, in a block 310, the platform computer 205 determines whether a move request or directive has been received or generated. Typically, the move request specifies a destination location (e.g., a latitude, longitude pair of geo-coordinates) to which the mobile platform 105 is to be moved, the destination location being over a threshold distance, e.g., 100 meters, 500 meters, etc., at which the mobile platform 105 is to be moved by a transport vehicle 125. The move request can be received from the server 120, which can be programmed to provide the move request to the mobile platform 105. The move request may be received via the network 130, e.g., from a user device 115, the server 120, etc. For example, user input could be provided to a user device 115 upon the device 115 receiving and displaying the current platform 105 location. Alternatively or additionally, a server 120 could instruct the platform 105 to move from a current location to a second location.

The platform 105 could be moved for a variety of reasons, e.g., to move from a first, current location to a second location to receive delivery of an item, to move to a second location for recharging, to move to a second location to avoid precipitation, wind, harsh sunlight, or other weather conditions, to move from a second location at which a delivery of an item was received to a third location after the item has been received (e.g., to return the mobile platform 105 and/or the item to the second location), etc.

Yet further, a move directive could be generated by the platform computer 205. For example, the computer 205 could receive, e.g., from a user device 115 via the network 130 and/or the server 120, a request or notification to accept delivery of an item. For example, the platform computer 205 could include programming to determine that the mobile platform 105 is at more than a predetermined distance from a planned delivery location of an item, the server 120 could determine that a planned delivery location of an item should be changed, e.g., based on weather conditions, a value of an item, etc. Moreover, a move request could be determined for a mobile platform 105 after an item is received.

If a move request is been received, then the process 300 proceeds to a block 315. Otherwise, the process 300 proceeds to a block 340.

In the block 315, the platform computer 205 determines whether a transport vehicle 125 has been located and identified to transport the mobile platform 105 in response to the move request. Selection of a transport vehicle 125 as discussed further below with respect to the process 400. Typically, as discussed further below, the server 120 will provide a notification to the mobile platform 105 including an identifier and a rendezvous location for a transport vehicle 125 to which the mobile platform 105 can attach to fulfill the move request. The notification could include other identifying information for a transport vehicle 125, such as a license plate number, indicia provided on an exterior of the transport vehicle 125, such as numbers and/or letters, a barcode or QR code or the like, etc. If a notification is not received within a specified amount of time, or if the server 120 provides a message to the platform computer 205 that the server 125 continues to attempt to locate a transport vehicle 125, then the process 300 may remain in the block 315 (or, although not illustrated, the process 300 could and if a transport vehicle 125 cannot be located and/or is not located within a specified period of time, e.g., three minutes, 10 minutes, etc.). If a transport vehicle 125 is identified, then the process 300 proceeds to a block 320.

In the block 320, the computer 205 operates the mobile platform 105 to attach to an identified transport vehicle 125. After receiving the move request in the block 310, and information about a transport vehicle 125 in the block 315, the computer 205 can control actuators 215 and a propulsion 220 to move the mobile platform 105 to a location to attach to the transport vehicle 125. For example, a current location of a mobile platform 105 could be a customer premises such as a residence; the mobile platform 105 could be stored, i.e., located, in a garage, driveway, parking lot, etc., of the residence. To attach to a transport vehicle 125, the mobile platform 105 could navigate to an end of the driveway, a specified location in a parking lot, etc., to achieve the attachment. Yet further, the server 120 could specify in the move request that the mobile platform 105 is to travel, e.g., according to its own propulsion 220, to a designated stopping location, sometimes referred to as a "port" location because such a location is designated for attaching to transport vehicles 125. For example, a port location could be on a highway median or other roadside, an area in a parking lot, etc.

Moreover, as discussed further below, multiple transport vehicles 125 could be sequentially used to move a mobile platform 105 from an origin location to a destination location specified in a move request. Accordingly, the computer 205 could execute programming to move the mobile platform 105 from a first location at which the oval platform 105 has been left by a first transport vehicle 125, to a second location for attachment to a second transport vehicle 125. For example, the computer 205 could move the mobile platform 105 from one side of a parking lot to another, across the street, down a block, etc.

Any suitable technology, such as that which presently exists, could be used for providing for autonomous operation of a vehicle could be utilized for the computer 205 to operate the mobile platform 105, e.g., data from sensors 210 could be provided to the computer 205, which could execute programming to navigate the mobile platform, 105 based on such data, to a location for attachment to a transport vehicle 125. Further, the computer 205 includes programming to identify a transport vehicle 125, e.g., by applying conventional image recognition techniques to a digital image obtained via a camera sensor 210-C, e.g., to read a barcode, QR code or the like, a license plate number, etc.

Upon navigating a mobile platform 105 to a location specified for attachment to a transport vehicle 125, computer 205 could execute programming to achieve the attachment. Any suitable mechanism for attaching the mobile platform 105 to a transport vehicle 125 could be used. For example, the computer 205 could execute programming to cause actuators 215 to extend arms holding one or more magnets 230, to position a hitch attachment (not shown in FIG. 2) for connection to the vehicle 125, to position hooks 235 for attachment to a complementary hook of a transport vehicle 125, etc.

Platform 105 sensors 210 can provide data by which the computer 205 can determine that the platform 105 is attached to a transport vehicle 125. For example, sensors are known for indicating that a magnet, hook, hitch, etc., is or is not connected. If the computer 205 determines that the platform 105 does not or is unable to attach to a transport vehicle 125, e.g., within a predetermined amount of time, e.g., three minutes, five minutes, etc., of receiving the notification of a transport vehicle 125 from the server 120, then the process 300 may return to the block 315 to identify a different transport vehicle 125. Otherwise, upon confirming that the mobile platform 105 is attached to the identified transport vehicle 125, the process 300 proceeds to a block 325.

In the block 325, the computer 205 determines whether the mobile platform 105 has arrived at a target location, i.e., the destination or target location specified in the move request received in the block 310. For example, the computer 205 can be substantially continuously monitoring a location of the mobile platform 105 based on receiving data from a GPS sensor 210. Alternatively or additionally, the computer 205 could receive a message from the server 120 and/or from a computer in a transport vehicle 125 specifying that a target location has been reached. Yet further alternatively or additionally, the computer 205 could be programmed to determine whether the mobile platform 105 has arrived in the target location upon being detached from a transport vehicle 125, e.g., upon the transport vehicle 125 disengaging hooks 235, magnets 230, and/or other attachment means. If the mobile platform 105 has not arrived at the target location, then the process 300 returns to the block 315 to identify a further transport vehicle 125 to move the platform 105 two or toward the target location. If the mobile platform 105 has arrived at the target location, then the process 300 proceeds to a block 330.

In the block 330, the mobile platform 105 awaits delivery of an item such as a package. For example, a weight sensor 210, an image sensor 210, and/or other suitable sensing means could be used to detect delivery of the item, e.g., by detecting a force applied to the platform 105, by using conventional image analysis techniques to detect an object, i.e., item, on platform 105, etc. An item could be delivered to the mobile platform 105 in a variety of ways, e.g., by a UAV, by a human delivery, etc. The computer 205 could be programmed to await delivery of an item for a specified amount of time, e.g., 30 minutes, 60 minutes, etc., past a specified delivery time, or a specified amount of time, e.g., 30 minutes, 60 minutes, etc., after arrival at a target destination, etc. If the specified amount of time passes without receiving an item, then the process 300 proceeds to a block 340. However, if an item is received in the specified amount of time, the process 300 proceeds to a block 335.

In the block 335, the computer 205 transmits a confirmation of receipt of an item to the server 120. The process 300 then proceeds to the block 310.

In the block 340, computer 205 determines whether the process 300 is to continue, and/or the process 300 is ended, e.g., by powering off or a loss of power in the computer 205. The computer 205 can determine that the process 300 is not to continue based on user input, e.g., via a device 120, according to a time of day, and/or according to a location stored in a memory of the computer 205, e.g., if the mobile platform 105 is not at a location specified for receiving an item, the process 300 could be ended. In any case, if the process 300 is to continue, the process 300 returns to the block 305. Otherwise, the process 300 ends following the block 340.

Figure 4:
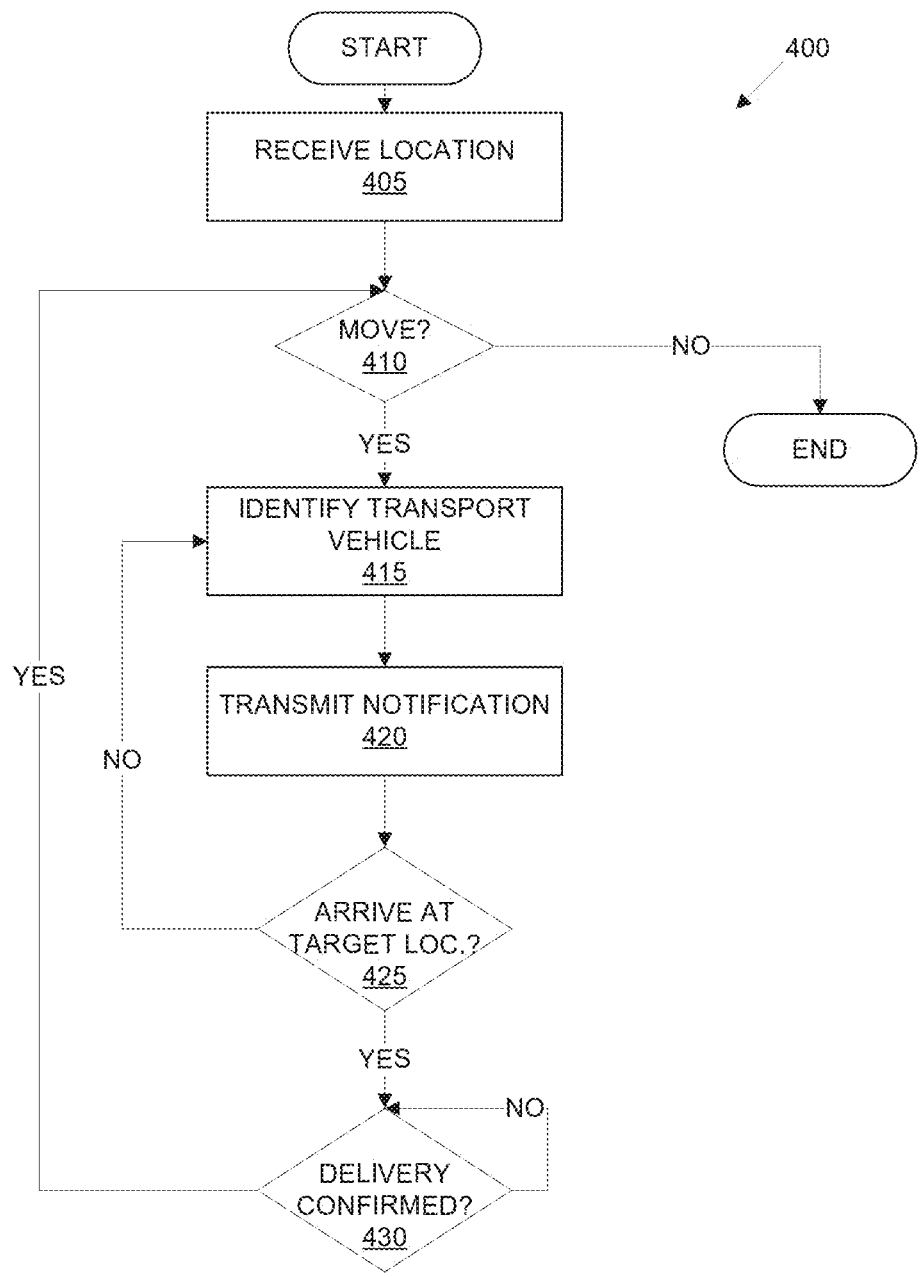
FIG. 4 illustrates an exemplary process for a server to monitor and/or instruct operation of a mobile platform.

FIG. 4 illustrates an exemplary process 400 for a server 120 to monitor and/or instruct operation of a mobile platform 105.

The process 400 begins in a block 405, in which the server 120 receives a current or last reported location of a mobile platform 105, typically according to a unique or substantially unique identifier of the mobile platform 105. Further, as described above with respect to the process 300, the server 120 in the process 400 could receive a location of the mobile platform 105 periodically, based on movement of the mobile platform 105, or on some other basis throughout execution of the process 400.

Next, in a block 410, the server 120 determines whether to transmit a move request to the mobile platform 105. For example, as discussed above, the server 120 could receive input via a user device 115 requesting to move the mobile platform 105, the server 120 could determine that the mobile platform 105 is at more than a predetermined distance from a planned delivery location of an item, the server 120 could determine that a planned delivery location of an item should be changed, e.g., based on weather conditions, a value of an item, etc. Moreover, a move request could be determined for a mobile platform 105 after an item is received, as described above. If it is determined to provide the mobile platform 105 with a move request, the process 400 proceeds to a block 415. Otherwise, the process 400 ends.

In the block 415, the server 120 identifies a transport vehicle 125 to fulfill the move request. A transport vehicle 125 can be selected based on criteria including one or more of a distance of the transport vehicle 125 from the mobile platform 105, a fee or cost for using the transport vehicle 125 to transport the mobile platform 105, a distance of a current destination of the transport vehicle 125 from a specified delivery location, or a distance of a closest waypoint of a planned route of the transport vehicle 125 from the specified delivery location. That is, the server 120 can receive data about available transport vehicles 125 and their respective locations and/or planned routes. Further, the server 120 can execute programming to identify a transport vehicle 125 within a predetermined distance, e.g., one kilometer, five kilometers, etc., of a mobile platform 105, where the transport vehicle 125 either has no planned route, or has a planned route with a waypoint and/or destination within a predetermined distance of a target location for the mobile transport 105. Alternatively or additionally, the server 120 could be programmed to identify a transport vehicle 125 with a route having a waypoint closer to the target location for the mobile transport 105 than routes of other possible transport vehicles 125.

Yet further alternatively or additionally, the server 120 could use data from one or more sensing devices 110 to identify potential transport vehicles 125 to move the mobile platform 105 from a current to a target location. For example, data from a sensing device 110, e.g., a camera, transponder, or other type of sensor providing identifying data for vehicles 125, could be provided to the server 120. The server 120 could then analyze such data, e.g., identifying a vehicle 125 typically within proximity to, i.e., a specified distance of, a sensing device 110 at specified times and/or days. Further, the server 120 could likewise store data that the sensing device 110 is within a proximity, i.e., a specified distance, of the mobile platform 105. The server 120 could then identify as a possible transport vehicles 125 such vehicles 125 identified via data from one or more sensing devices 110 as likely to be within proximity of the mobile platform 105 at a desired time, in addition to or in lieu of noting that the current location of the transport vehicle 125 is within proximity of the mobile platform 105 at a current time.

Further, the server 120 could negotiate with a transport vehicle 125 and/or a second server controlling the transport vehicle 125 (e.g., where the transport vehicle 125 is part of a rideshare service or the like). The server 120 could, for example, offer to pay a cost per distance, whereupon the transport vehicle 125 or controlling server could have a minimum acceptable cost stored in its memory, and could respond based thereon. Alternatively or additionally, it is possible in the block 415, that user input, e.g., via a user device 115 in communication with the server 120, could be provided to negotiate with a second user device 115 of a user owning or controlling a transport vehicle 125. For example, the server 120 could store a permissible cost of selecting a transport vehicle 125, e.g., a permissible total cost, a permissible cost per kilometer, etc., and upon identifying a transport vehicle 125 that exceeds a user-specified cost, the server 120 could request user input to authorize exceeding such cost. Yet further, a first user device 115 of a user requesting a transport vehicle 125 to move a mobile platform 105 could provide an offer of a fee to be paid for the second mobile platform 104. The server 120, upon receiving such offer, could then provide it to a second user device 115 of a user owning and/or controlling the transport vehicle 125. The transport vehicle 125 could be selected if the second user device 115 received input to accept the offer.

Next, in the block 420, the server 120 transmits a notification, as described above with respect to the process 300, to the mobile platform 105 specifying the move request and identifying a transport vehicle 125.

Next, in the block 425, the server 120 determines whether the mobile transport 105 has provided a message stating that it has arrived at a target location. The server 120 could be programmed to wait a predetermined time, e.g., a time specified for a transport vehicle 125 to take the mobile transport 105 to the target location, and, although not shown in FIG. 4, and the process if such message is not received. As shown in 4, if the server 120 receives notification from the mobile platform 105 that it is at a location that is not the target location and is detached from the transport vehicle 125, then the process 400 returns to the block 415. Otherwise, the process 400 proceeds to a block 430.

In the block 430, the mobile platform 105 having arrived at its target location, the server 120 determines whether a message stating that an item has been delivered has been received from the mobile platform 105. The server 120 can remain in the block 430 until such message is received, or, although not shown in FIG. 4, may end by noting or logging a, e.g., delivery failure if such message is not received within a predetermined time, e.g., one hour, four hours, etc., of a specified delivery time. If delivery of an item is confirmed by the mobile platform 105, then the process 400 returns to the block 410.

Figure 5:
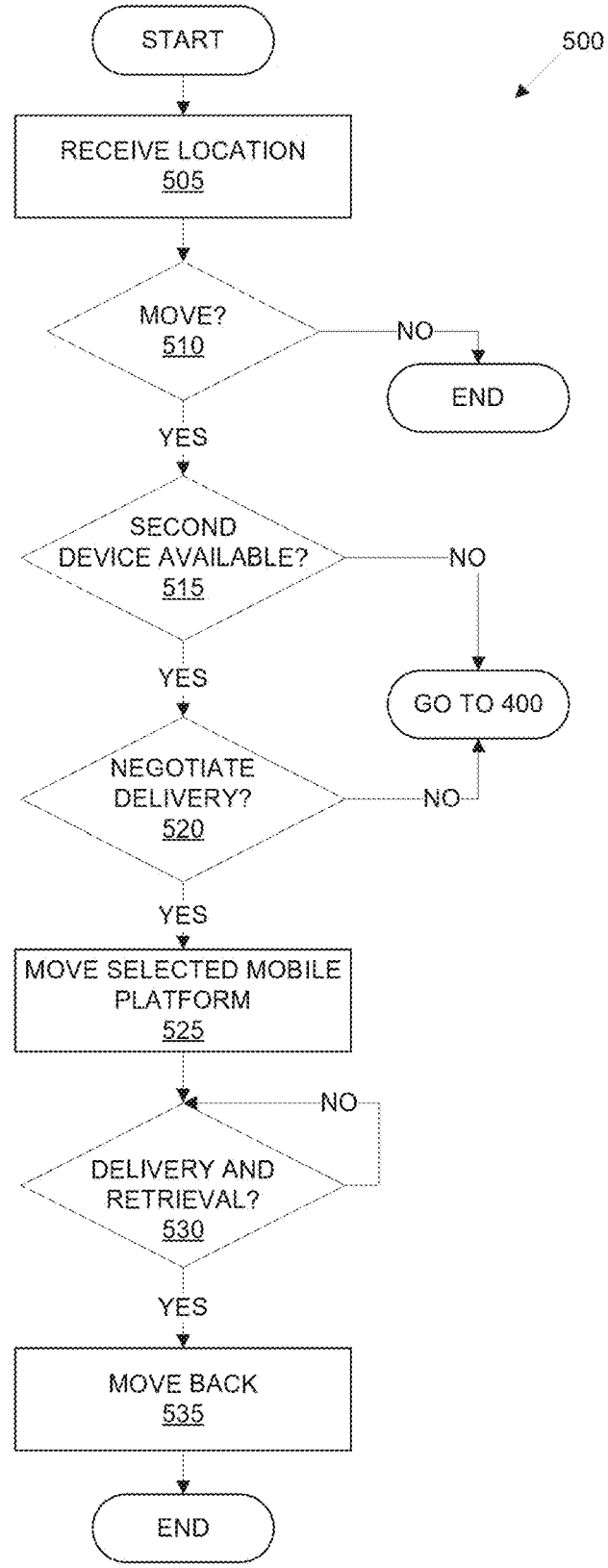
FIG. 5 illustrates another exemplary process for a server to monitor and/or instruct operation of a mobile platform.

FIG. 5 illustrates a further exemplary process 500 for a server 120 to monitor and/or instruct operation of a mobile platform 105.

The process 500 begins in a block 505, which is executed in a manner described with respect to the block 405 described above.

Then, in a block 510, similar the block 410 described above, the server 120 can determine whether a first mobile platform 105 whose location was received in the block 505 should be the subject of a move request. If not, the process 500 ends; if so, however, in contrast to the process 400, the process 500 then proceeds to a block 515 in which the server 120 executes programming to determine whether a closer second mobile platform 105 is available to receive an item specified for the first mobile platform 105. For example, the first mobile platform 105 could be associated with an identifier for a user specified to receive delivery of an item at a specified delivery location. As explained above, a user device 115 could submit a request, including a user identifier, for an item to be delivered at the specified delivery location, whereupon a mobile platform 105 should be provided at the specified delivery location to receive the item. However, it may be desirable for a second mobile platform 105 other than a first mobile platform 105 associated with the user identifier to receive the item.

Determining whether a second mobile platform 105 is available typically includes evaluating respective current or last reported locations of a plurality of mobile platforms 105. For example, each of a plurality of mobile platforms 105 could periodically and/or upon some event, e.g., a change of location of more than a specified distance, report a location to the server 120. The server 120 could then compare a first distance of the first mobile platform 105 to a specified delivery location to a second distance of a second mobile platform 105 to the specified delivery location. If the second distance is less, then the server 120 could determine to request the second mobile platform 105 to the specified delivery location. Further, the server 120 could select a second mobile platform 105 from a plurality of available mobile platforms 105 based on the second mobile platform 105 having a shortest distance to the specified delivery location.

Alternatively or additionally, the server 120 could select a second mobile platform 105 based on a cost of using the second mobile platform 105. As explained above, the server 120 and/or a mobile platform 105 can store costs and/or fees for operating or using the mobile platform 105. Thus, the server 120 could query its memory and/or mobile platforms 105 to select a least expensive mobile platform 105 within a predetermined distance, e.g., five kilometers, 10 kilometers, etc., of a specified delivery location or could consider cost and distance, e.g., scoring available second mobile platforms 105 according to a formula that accounts for both cost and distance, e.g., (cost per kilometer)*w1+ distance*w2, where w1 and w2 are weights that can be selected to give more or less weight, respectively, to cost, e.g., in monetary terms, and distance.

If a second device is not identified as available to accept the delivery, then following the block 515, the process 500 ends, and the process 400 is executed with respect to the mobile platform 105 associated with the user identifier that is also associated with the planned or expected delivery of the item. However, if a second mobile platform 105 is identified, then the process 500 proceeds to a block 520.

In the block 520, the server 120 attempts to negotiate with a mobile platform 105 selected in the block 515 to receive the delivery of the item. That is, the server 120 specifies a location and time of the delivery, and requests the selected second mobile platform 105 to confirm it will move to the location and accept the delivery. If the delivery is negotiated, then the process 500 proceeds to a block 525. Otherwise, the process 500 can proceed to the process 400 as described in the previous paragraph, or alternatively (although not shown in FIG. 5) could return to the block 515 to attempt to identify a further possible second mobile platform 105.

Further, it is possible in the block 520, that user input, e.g., via a user device 115 in communication with the server 120, could be provided to negotiate with a selected second mobile platform 105. For example, the server 120 could store a permissible cost of selecting a second mobile platform 105, e.g., a permissible total cost, a permissible cost per kilometer, etc., and upon identifying a mobile platform 105 that exceed a user-specified cost, the server 120 could request user input to authorize exceeding such cost. Yet further, a first user device 115 of a user requesting a second mobile platform 105 for delivery of the first user's item could provide an offer of a fee to be paid for the second mobile platform 104. The server 120, upon receiving such offer, could then provide it to a second user device 115 of a user owning and/or controlling the second mobile platform 105. The second mobile platform 105 could be selected if the second user device 115 received input to accept the offer.

In a block 525, which may follow the block 520 as just described, the selected second mobile platform 105 moves to the specified delivery location, e.g., as described with respect to the process 400.

Following the block 525, next, in a block 530, the server 120 determines whether an item has been delivered to the selected second mobile platform 105. Such determination may be made as described above with respect to the process 400. Once a delivery is confirmed, e.g., by a message from the selected second platform 105 to the server 120, then the process 500 proceeds to a block 335. The process 500 can remain in the block 530 until such determination is made. Alternatively or additionally, although not shown in FIG. 5, if delivery is not made within a specified time, the process 500 could proceed to the block 535.

In the block 535, the selected second mobile platform 105 may be moved from the delivery location to a further location, e.g., returned to its location at the beginning of the process 500, or some other location.

Following the block 535, the process 500 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a mobile platform computer, the computer comprising a processor and a memory, the memory storing instructions executable by the processor such that the computer is programmed to:
- determine a request to move from a first location to a second location to receive an item, the request specifying a transport vehicle to move the mobile platform from the first location to the second location, wherein specifying the transport vehicle includes selecting the transport vehicle based on at least a cost of using the transport vehicle;
- request user input to authorize exceeding a user specified cost when the cost of using the specified transport vehicle exceeds the user specified cost;
- determine that the mobile platform is at more than a predetermined distance from the second location;
- change the second location in response to determining that the mobile platform is at more than the predetermined distance;
- operate the mobile platform to move to the transport vehicle;
- identify the transport vehicle with a camera sensor carried by the mobile platform;
- actuate the mobile platform to extend one or more arms holding one or more magnets to attach to the transport vehicle, and
- detect that the item has been received with a weight sensor carried by the mobile platform.

2. The system of claim 1, further comprising a server computer comprising a server processor and a server memory, the server memory storing instructions executable by the server processor such that the server computer is programmed to send the request to the mobile transport platform computer.

3. The system of claim 1, the memory further storing instructions to transmit a location of the mobile platform to a server computer.

4. The system of claim 1, the memory further storing instructions to, upon determining that the transport vehicle has arrived at the second location, actuate the mobile platform to detach from the transport vehicle.

5. The system of claim 1, wherein the second location is a waypoint and the memory further storing instructions to, upon determining that the transport vehicle has arrived at the waypoint, actuate the mobile platform to detach from the transport vehicle.

6. The system of claim 5, the memory further storing instructions to actuate the mobile platform to attach to a second transport vehicle at the waypoint.

7. The system of claim 1, the memory further storing instructions to detect that the mobile transport platform is at the second location, and to the second location to a server computer as a current location of the mobile platform.

8. The system of claim 7, the memory further storing instructions to transmit to a server computer a confirmation that the item has been received at the second location, and then to receive a second request to move from the second location to a third location.

9. The system of claim 1, wherein the request to move is determined by one of a (a) message from a server computer and (b) a request from a user device to accept delivery of an item.

10. A system comprising a server computer, the computer comprising a processor and a memory, the memory storing instructions executable by the processor such that the server computer is programmed to:
- identify a mobile platform to receive an item at a delivery location;
- identify a transport vehicle to move the mobile platform from a current location to the delivery location, wherein identifying the transport vehicle includes selecting the transport vehicle based on at least a cost of using the transport vehicle;
- request user input to authorize exceeding a user specified cost when the cost of using the specified transport vehicle exceeds the user specified cost;
- determine that the mobile platform is at more than a predetermined distance from the delivery location;
- change the delivery location in response to determining that the mobile platform is at more than the predetermined distance;
- transmit to the mobile platform a request to move from the current location to the delivery location to receive the item, the request specifying the transport vehicle;
- transmit to the mobile platform a request to move to the transport vehicle;
- transmit to the mobile platform a request to identify the transport vehicle with a camera sensor carried by the mobile platform;
- transmit to the mobile platform a request to extend one or more arms holding one or more magnets to attach to the transport vehicle; and
- detect that the item has been received with a weight sensor carried by the mobile platform.

11. The system of claim 10, the instructions further including instructions to select the mobile platform according to a user identifier associated with the mobile platform.

12. The system of claim 10, the instructions further including instructions to select the mobile platform according to at least one of the current location of the mobile platform and a cost of using the mobile platform.

13. A method, comprising:
- determining a request to move from a first location to a second location to receive an item, the request specifying a transport vehicle to move the mobile platform from the first location to the second location, wherein specifying the transport vehicle includes selecting the transport vehicle based on at least a cost of using the transport vehicle;
- requesting user input to authorize exceeding a user specified cost when the cost of using the specified transport vehicle exceeds the user specified cost;
- determining that the mobile platform is at more than a predetermined distance from the second location;
- changing the second location in response to determining that the mobile platform is at more than the predetermined distance
- operating the mobile platform to move to the transport vehicle;
- identifying the transport vehicle with a camera sensor carried by the mobile platform;
- actuating the mobile platform to extend one or more arms holding one or more magnets to attach to the transport vehicle,
- detecting that the item has been received with a weight sensor carried by the mobile platform.

14. The method of claim 13, further comprising a server computer sending the request to a mobile transport platform computer.

15. The method of claim 13, further comprising transmitting a location of the mobile platform to a server computer.

16. The method of claim 13, further comprising, upon determining that the transport vehicle has arrived at the second location, actuating the mobile platform to detach from the transport vehicle.

17. The method of claim 13, wherein the second location is a waypoint and further comprising, upon determining that the transport vehicle has arrived at the waypoint, actuating the mobile platform to detach from the transport vehicle.

18. The method of claim 17, further comprising actuating the mobile platform to attach to a second transport vehicle at the waypoint.

19. The method of claim 13, further comprising detecting that the mobile transport platform is at the second location, and transmitting the second location to a server computer as a current location of the mobile platform.

* * * * *

UNITED STATES PATENT AND TRADEMARK OFFICE
CERTIFICATE OF CORRECTION

| | |
|---|---|
| PATENT NO. | : 11,769,106 B2 |
| APPLICATION NO. | : 16/230715 |
| DATED | : September 26, 2023 |
| INVENTOR(S) | : Nicholas Brandon Newell et al. |

It is certified that error appears in the above-identified patent and that said Letters Patent is hereby corrected as shown below:

In the Claims

In Claim 1, Column 13, Line 25, after "vehicle" delete the "," and insert a --;--

In Claim 13, Column 14, Line 56, after "vehicle" delete the "," and insert a --;--

Signed and Sealed this
Thirty-first Day of October, 2023

Katherine Kelly Vidal
*Director of the United States Patent and Trademark Office*